(12) United States Patent
Mochizuki et al.

(10) Patent No.: US 9,517,743 B2
(45) Date of Patent: Dec. 13, 2016

(54) VEHICLE INTERIOR STRUCTURE

(71) Applicant: Nissan Motor Co., Ltd., Kanagawa (JP)

(72) Inventors: Haruka Mochizuki, Kanagawa (JP); Hitoshi Nito, Kanagawa (JP); Wataru Suzuki, Kanagawa (JP); Takashi Mukaiyama, Kanagawa (JP); Hiroyuki Ide, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/767,614

(22) PCT Filed: Dec. 20, 2013

(86) PCT No.: PCT/JP2013/084217
§ 371 (c)(1),
(2) Date: Aug. 13, 2015

(87) PCT Pub. No.: WO2014/129075
PCT Pub. Date: Aug. 28, 2014

(65) Prior Publication Data
US 2015/0375705 A1 Dec. 31, 2015

(30) Foreign Application Priority Data

Feb. 19, 2013 (JP) .................................. 2013-029929

(51) Int. Cl.
*B60R 21/02* (2006.01)
*B60R 21/12* (2006.01)
*B60J 5/06* (2006.01)

(52) U.S. Cl.
CPC .................. *B60R 21/12* (2013.01); *B60J 5/06* (2013.01); *B60R 2021/0273* (2013.01)

(58) Field of Classification Search
CPC ....................................................... B60R 21/12
USPC . 296/24.42, 24.46, 24.43, 155, 85; D12/195
See application file for complete search history.

(56) References Cited

U.S. PATENT DOCUMENTS

| 6,357,979 B1* | 3/2002 | Montagna | B60R 21/026 410/121 |
| 6,616,202 B2* | 9/2003 | Choi | E05B 85/12 292/336.3 |
| 2004/0164582 A1* | 8/2004 | Swift | B60N 2/24 296/66 |

FOREIGN PATENT DOCUMENTS

JP 2009-046104 A 3/2009

* cited by examiner

*Primary Examiner* — Dennis H Pedder
(74) *Attorney, Agent, or Firm* — Osha Liang LLP

(57) ABSTRACT

A vehicle interior structure has a driver's seat disposed inside a cabin, a rear passenger's seat disposed on a vehicle rear side of the driver's seat inside the cabin, a partition wall member extending in a vehicle width direction between the driver's seat and the rear passenger's seat, and an inside handle for opening that opens a door on a side of the rear passenger's seat. The inside handle is set at a position rearward of and close to a vehicle outer end portion of the partition wall member in the vehicle width direction. The partition wall member includes an inclining surface portion inclining such that the inclining surface portion becomes closer to a vehicle front side as extending toward a vehicle center from the vehicle outer end portion.

2 Claims, 7 Drawing Sheets

VEHICLE INTERIOR STRUCTURE

CROSS-REFERENCE TO RELATED APPLICATIONS

This application claims priority to Japanese Patent Application No. 2013-029929 filed on Feb. 19, 2013, the entire contents of which are incorporated herein by reference.

BACKGROUND

1. Technical Field

The present invention relates to a vehicle interior structure.

2. Related Art

For crime prevention of a vehicle such as a taxi, a technique has been known in which a partition panel is provided along the vehicle width direction between a driver's seat and rear passenger's seats behind the driver's seat (see Patent Literature 1). As a partition wall member therefor, there is one arranged in such a way as to bridge pillar members on both left and right sides of the vehicle body.

CITATION LIST

Patent Literature

Patent Literature 1: Japanese Patent Application Publication No. 2009-46104

SUMMARY

Here, the inside handles of doors for getting into and out of the rear passenger's seats are sometimes disposed on front portions of the doors, i.e., close to vehicle outer end portions of the partition wall member in the vehicle width direction. In this case, when a side collision load is inputted to the lateral side of the vehicle, and the partition wall member is deformed in such a way as to bulge toward the vehicle rear side, the vehicle outer end portion of the partition wall member may possibly come into contact with the inside handle of the corresponding door and open the door.

One or more embodiments of the present invention provides a vehicle interior structure which, when a side collision load is inputted to the lateral side of the vehicle, prevents a door from being opened by a partition wall member.

One or more embodiments of the present invention provides a vehicle interior structure in which a partition wall member extends in the vehicle width direction between a driver's seat on the front side and a rear passenger's seat on the rear side, and an inside handle for opening a door on the rear passenger's seat side is disposed at a position rearward of and close to a vehicle outer end portion of the partition wall member in the vehicle width direction. The partition wall member is provided with an inclining surface portion inclining such that the inclining surface portion becomes closer to the vehicle front side as extending toward the vehicle center from the vehicle outer end portion in the vehicle width direction.

DETAILED DESCRIPTION

Figure 1:
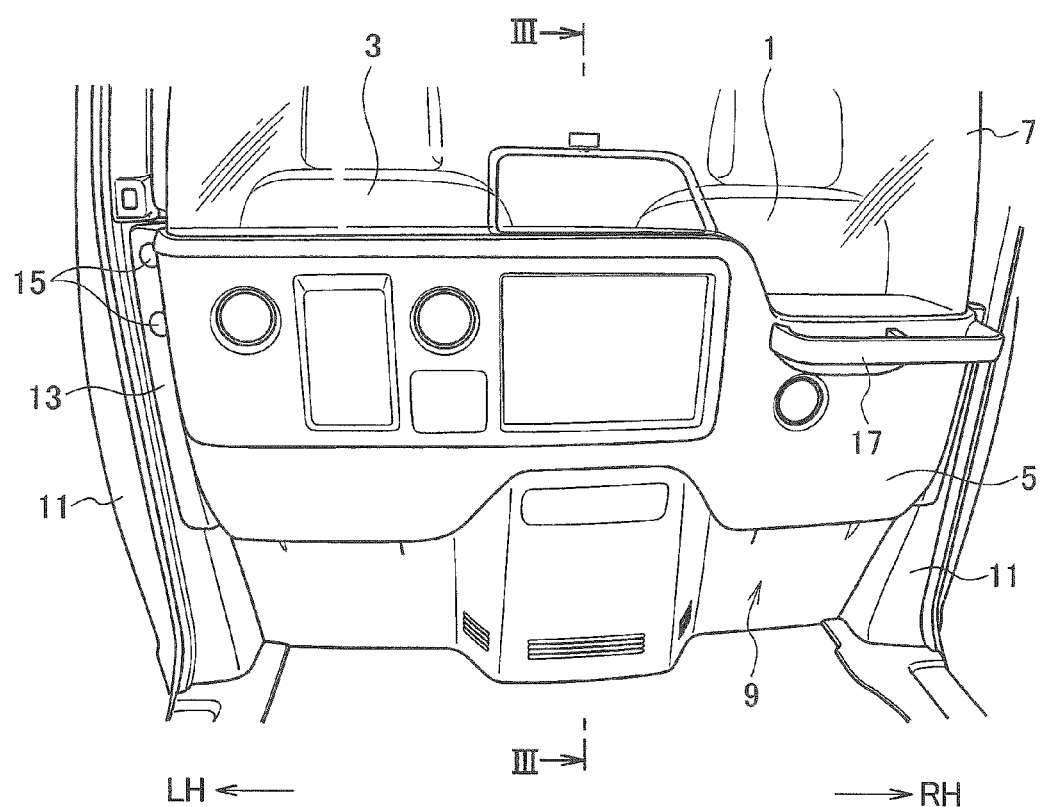
FIG. 1 is a perspective view of partition means according to one or more embodiments of the present invention as seen from the rear of its vehicle.

Hereinbelow, embodiments of the present invention will be described in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Note that in the drawings, FR, RR, UPR, LWR, and LH denote the front side, rear side, upper side, lower side, and left side of a vehicle, respectively.

As shown in FIG. 1, in a front area of a cabin, a driver's seat 1 is arranged on the right side, and a front passenger's seat 3 is arranged to the left of the driver's seat 1. Rear passenger's seats 4 (see FIG. 3) are arranged on the vehicle rear side of the driver's seat 1 and the front passenger's seat 3. Partition means 9 including a partition wall member 5 and a partition panel 7 is arranged along the vehicle width direction between the driver's seat 1 and the rear passenger's seats 4. By separating the driver's seat 1 and front passenger's seat 3 from the rear passenger's seats 4 with the partition means 9, vehicle interior structure exhibits a function of preventing crime in the vehicle such as a taxi.

Specifically, at both left and right end areas in the vehicle in the vehicle width direction, a pair of left and right center pillars 11 extend in the vertical direction, respectively, and a partition wall member 5 extends in the vehicle width direction and connects these center pillars 11 and 11 to each other. More specifically, flange section 13 protruding outward in the vehicle width direction are formed at both left and right ends of the partition wall member 5, and upper portions of the flange section 13 are coupled to the corresponding center pillars 11 through fixing portions 15. Note that a fare receiving part 17 is provided on the rear side (rear passenger's seats 4 side) of a right end portion of the partition wall member 5. Fare and change are given and received between the driver and the passenger through this fare receiving part 17. Moreover, the partition panel 7 made of clear polycarbonate is arranged along the vehicle width direction on top of the partition wall member 5.

Figure 2:
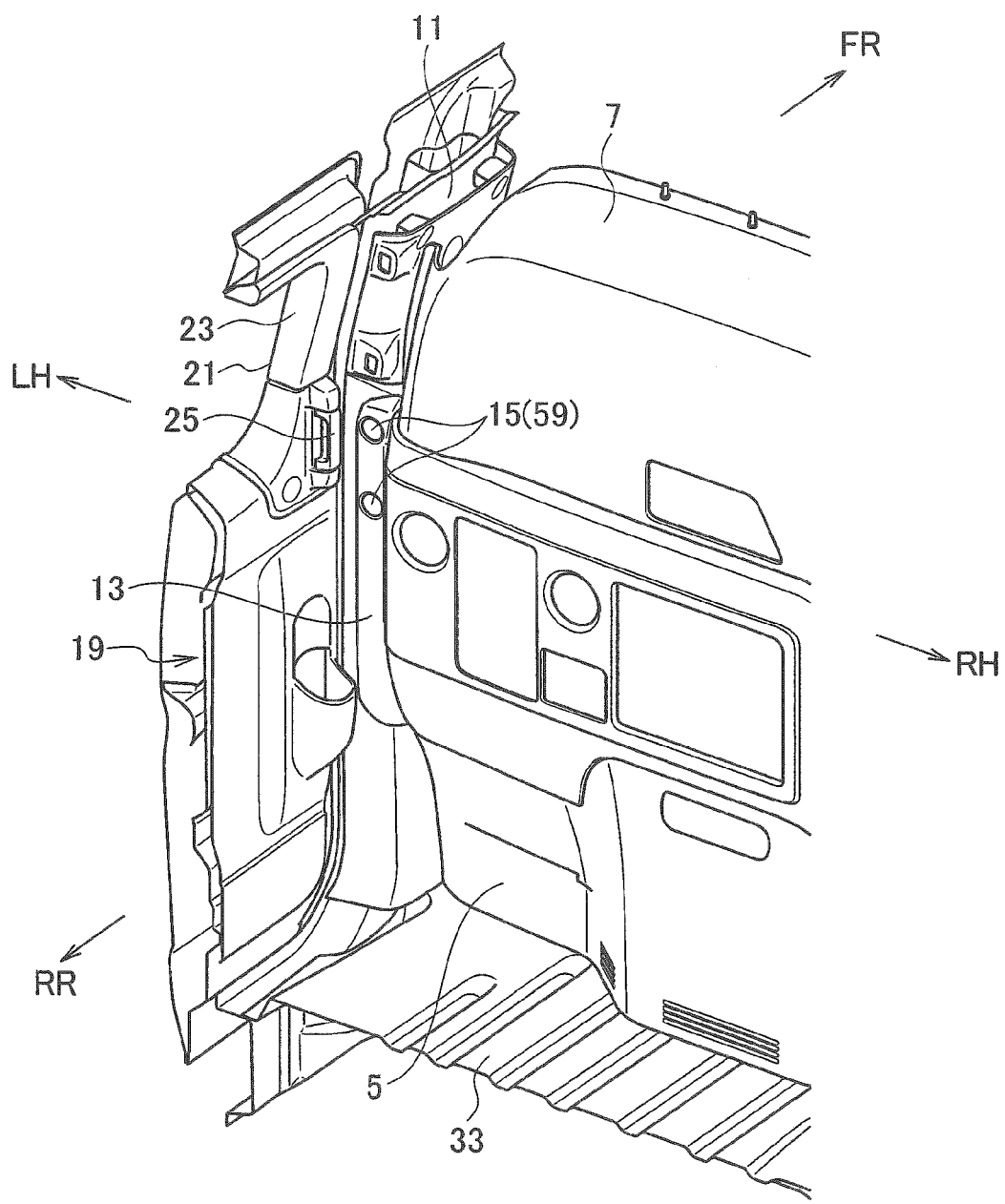
FIG. 2 is a perspective view of the partition means in FIG. 1 around a vehicle left end portion thereof as seen diagonally from the rear.

As shown in FIG. 2, a sliding door 19 (door) which forms a lateral side of the vehicle body is disposed behind each center pillar 11. An opening window 21 is provided in an upper portion of this sliding door 19, and an inside handle 25 is arranged on the cabin side of a front lower corner portion of a frame body 23 of the opening window 21. Specifically, the inside handle 25 is disposed on the cabin side of an upper portion of a front end section of the sliding door 19. This inside handle 25 is supported swingably in the front-rear direction. By swinging the inside handle 25, a lock in the sliding door 19 is released and the sliding door 19 can be opened and closed. Thus, the sliding door 19 can be opened by swinging the inside handle 25 to thereby release the lock in the sliding door 19 and then sliding the sliding door 19 toward the vehicle rear. Note that the fixing portions 15 provided to the flange section 13 of the partition wall member 5 are disposed at substantially the same height as the inside handle 25 and are disposed close to the inside handle 25. Specifically, the inside handle 25 is disposed at a position rearward of and close to the fixing portions 15 provided to a vehicle outer end portion of the partition wall member 5 in the vehicle width direction.

Figure 3:
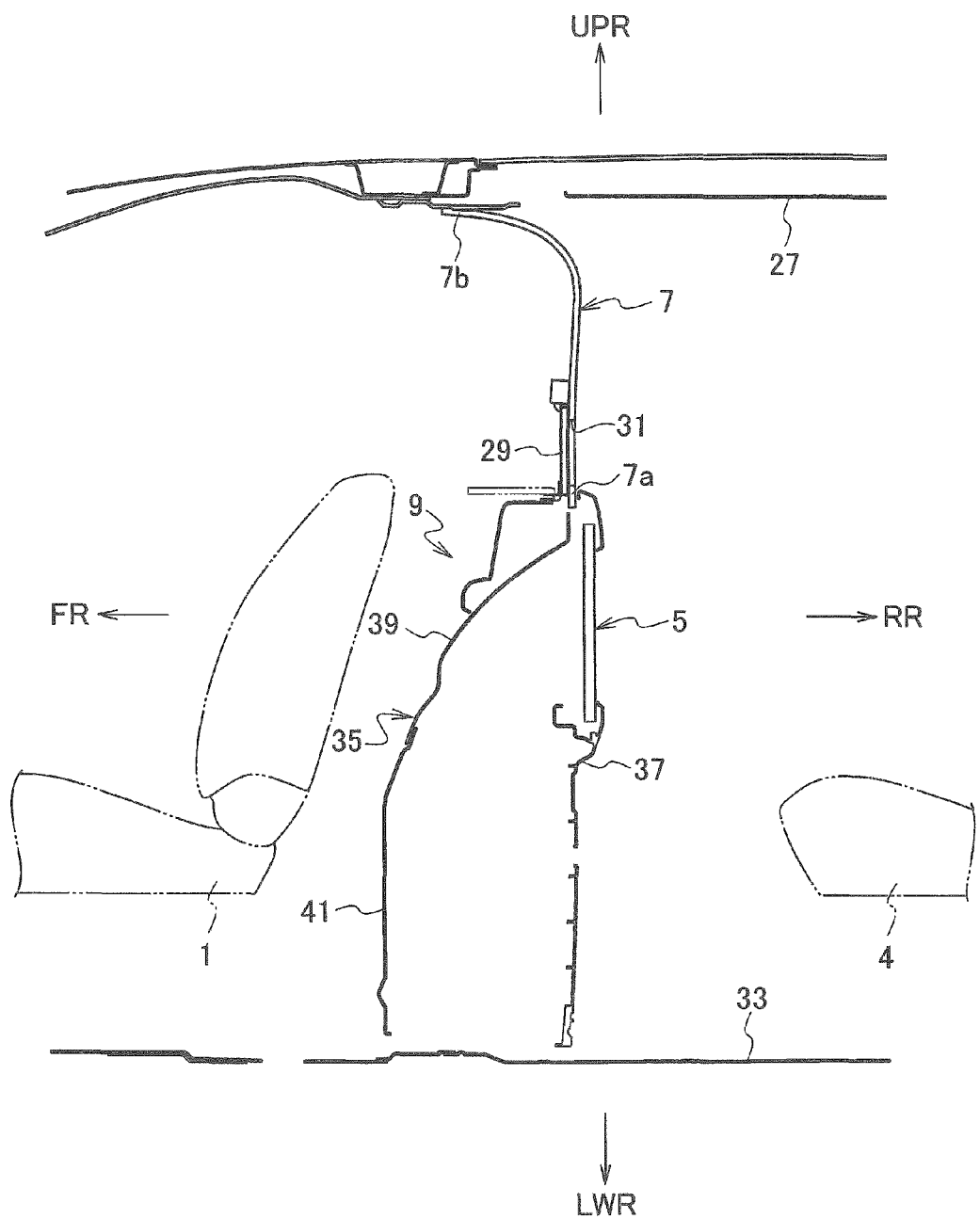
FIG. 3 is a cross-sectional view taken along line III-III in FIG. 1.

As shown in FIG. 3, a lower end portion 7a of the partition panel 7 is coupled to the upper end of the partition wall member 5, and an upper end portion 7b of the partition panel 7 is coupled to a ceiling interior member 27. Moreover, an openable-closable window 29 having a substantially rectangular shape in a front view is provided in a lower portion of the partition panel 7 on the vehicle center side in the vehicle width direction. By opening the openable-closable window 29, small articles such as a map can be given and received between the driver and the passenger through an opening portion 31. Note that a floor panel 33 is arranged under the partition wall member 5.

Moreover, as shown in FIG. 3, the partition wall member 5 includes a front panel 35 made of metal and disposed on the vehicle front side, and an interior member 37 made of resin and arranged behind the front panel 35. The stiffness of the front panel 35 is higher than the stiffness of the interior member 37. For this reason, the stiffness of the whole partition wall member 5 is determined mostly by the stiffness of the front panel 35. The front panel 35 is formed by joining an upper panel 39 on the upper side in the height direction and a lower panel 41 disposed below the upper panel 39. Moreover, the front panel 35 is formed in a J-shape bulging toward the front as a whole in a side view. Specifically, the upper panel 39 of the front panel 35 bulges in such a way as to be closer to the front as extending downward, while most part of the lower panel 41 extends in the vertical direction. Note that in FIGS. 3, 6, and 7, illustration of a cover member covering the front side of the front panel 35 is omitted.

Figure 4:
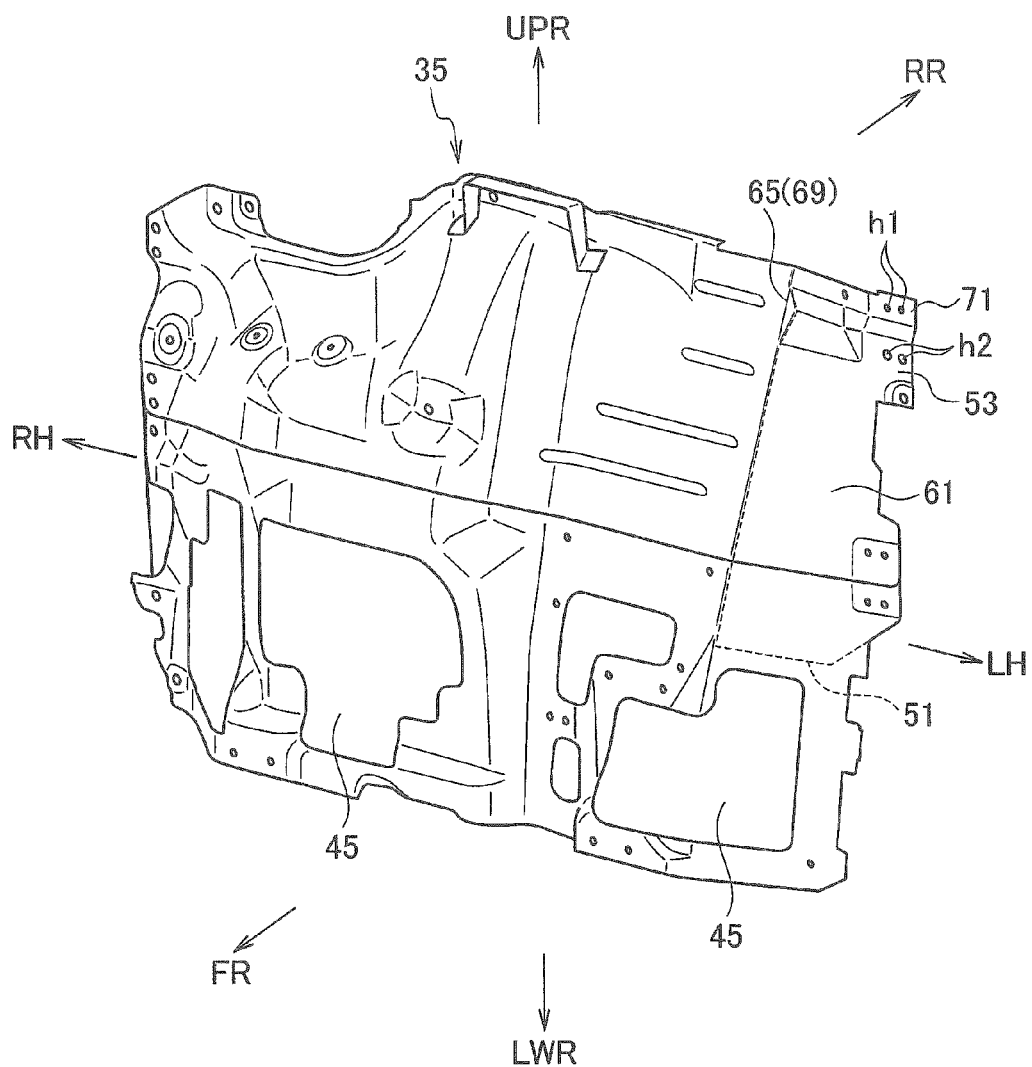
FIG. 4 is a perspective view of a front panel which forms a partition wall member, as seen diagonally from the front.
Figure 5:
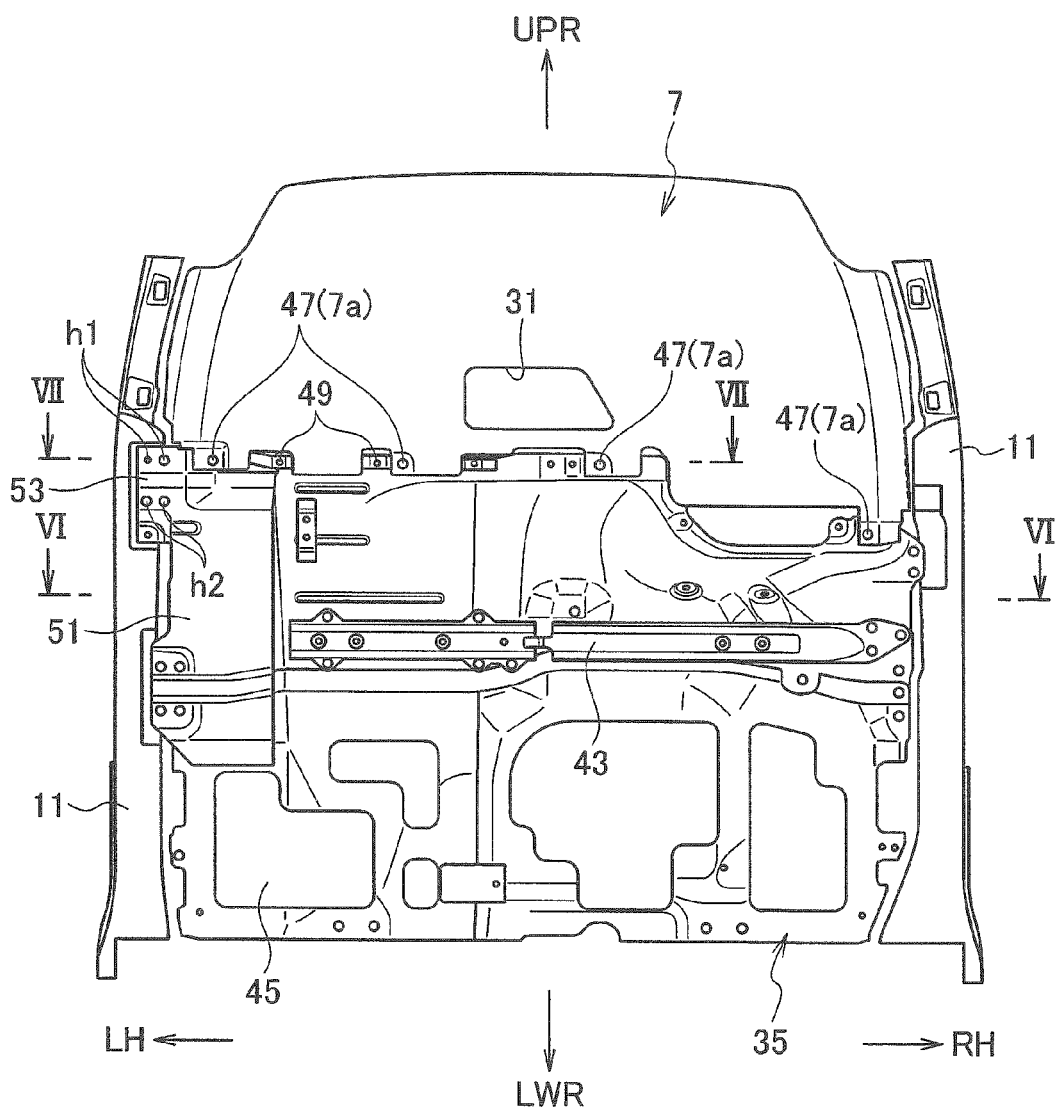
FIG. 5 is a back view of FIG. 1 as seen from the vehicle rear side.

As shown in FIGS. 4 and 5, the front panel 35 of the partition wall member 5 is formed in a rectangular shape in front and back views. A reinforcement bracket 43, which is long in the vehicle width direction, is coupled to a vertical center portion of the back surface (rear surface) of the front panel 35, and a plurality of openings 45 are formed in a lower portion of the front panel 35. The lower end portion 7a of the partition panel 7 is fastened to an upper edge portion of the front panel 35 through fastening portions 47 at four locations given along the vehicle width direction, and support brackets 49 for fixing the interior member 37 to the front panel 35 are attached to the upper edge portion. Moreover, as shown in FIGS. 4 to 7, a vertically long rectangular reinforcement panel 51 extending in the vertical direction is joined to a left end portion of the back surface of the front panel 35 in abutment with (i.e. in surface contact with) the back surface.

Moreover, as shown in FIGS. 4 and 5, an upper end corner portion of the left end of the front panel 35 is set as a pillar coupling portion 53 through which to couple the front panel 35 to the center pillar 11. Specifically, a pair of left and right bolt insertion holes h1 are formed on the upper side of the pillar coupling portion 53, while a pair of left and right bolt insertion holes h2 are formed on the lower side of the pillar coupling portion 53. Moreover, as shown in FIG. 7, the center pillar 11 is provided with an attachment bracket 55 which is joined to a rear end portion of the center pillar 11 and extends inward in the vehicle width direction and in which bolt insertion holes are formed. The pillar coupling portion 53 of the front panel 35 and the attachment bracket 55 on the center pillar 11 side are set in abutment with each other with their insertion holes aligned with each other, and they are coupled to each other with bolts 57 and nuts. The fixing portions 15 mentioned earlier are the coupled portions of the pillar coupling portion 53 of the front panel 35 and the attachment bracket 55 on the center pillar 11 side. Note that, as shown in FIG. 7, circular holes are formed in the interior member 37 at positions corresponding to the positions of the bolts 57 and the holes are closed by resin caps 59.

Figure 6:
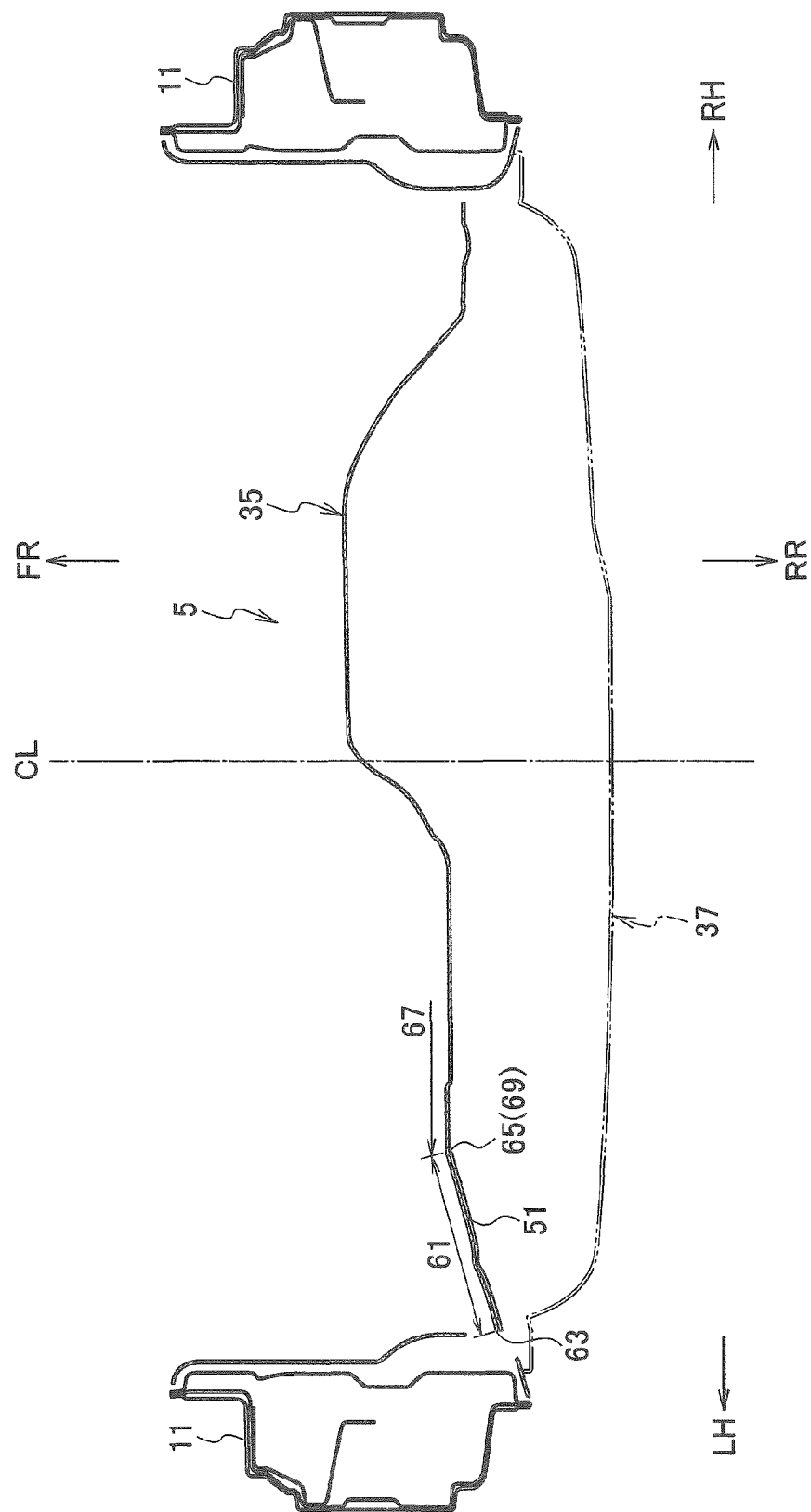
FIG. 6 is a cross-sectional view taken along line VI-VI in FIG. 5.
Figure 7:
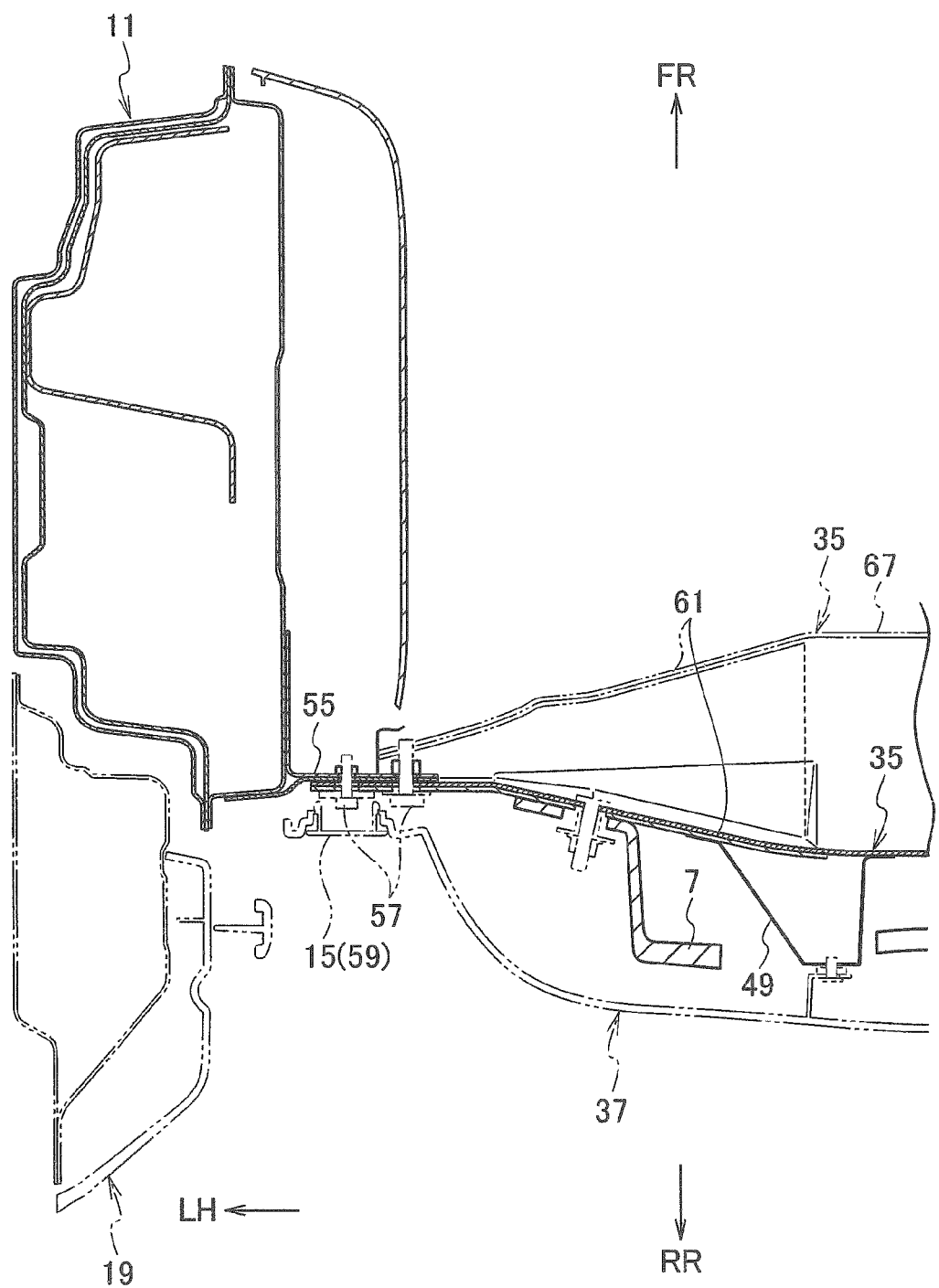
FIG. 7 is a cross-sectional view taken along line VII-VII in FIG. 5.

As shown in FIG. 6 and in FIG. 7 with two-dot chain lines, an inclining surface portion 61 is formed at a left portion of the front panel 35. Note that the front panel 35 in FIG. 7 illustrated with solid lines is a cross section taken along line VII-VII in FIG. 5 and the front panel 35 in FIG. 7 illustrated with two-dot chain lines is a cross section taken along line VI-VI in FIG. 5. This inclining surface portion 61 extends toward a vehicle center CL from a vehicle outer end portion 63 (left end portion) of the front panel 35 in the vehicle width direction, and inclines in such a way as to be closer to the vehicle front side in a plan view as extending toward the vehicle center CL from the vehicle outer end portion 63.

Moreover, in an area inwardly next to (to the right of) the inclining surface portion 61 in the vehicle width direction, a general surface portion 67 is disposed which bends at an edge 65 of the inclining surface portion 61 in the vehicle width direction and extends in the vehicle width direction. The boundary between these inclining surface portion 61 and general surface portion 67 forms a ridge line 69 which extends in the vertical direction. As shown in FIGS. 4 to 7, the reinforcement panel 51 is joined to the back surface of the inclining surface portion 61 in abutment therewith. Specifically, the vehicle outer edge of the reinforcement panel 51 in the vehicle width direction is disposed to coincide with the vehicle outer edge of the front panel 35; the upper edge of the reinforcement panel 51 is disposed to coincide with the upper edge of the front panel 35; and the vehicle outer edge of the reinforcement panel 51 in the vehicle width direction is disposed to coincide with the ridge line 69 of the front panel 35. As described above, the reinforcement panel 51 extending to the ridge line 69 is lapped and attached to the inclining surface portion 61.

Hereinbelow, advantages of one or more embodiments of the present invention will be described. The below advantages are merely exemplary, advantages of one or more embodiments of the present invention are not limited to be below. Furthermore, the claims are not limited in any way by the exemplary advantages.

(1) In the vehicle interior structure according to one or more embodiments of the present invention, the partition wall member 5 extends in the vehicle width direction between the driver's seat 1 disposed inside the cabin and the rear passenger's seats 4 disposed on the vehicle rear side of the driver's seat 1. Each inside handle 25 for opening the sliding door 19 (door) on the rear passenger's seats 4 side is set at a position rearward of and close to the vehicle outer end portion 63 of the partition wall member 5 in the vehicle width direction. The partition wall member 5 includes the inclining surface portion 61 inclining such that the inclining surface portion 61 becomes closer to the vehicle front side as extending toward the vehicle center CL from the vehicle outer end portion 63 in the vehicle width direction.

When a side collision load is inputted to the lateral side of the vehicle and a load which causes compression in the vehicle width direction is inputted to the partition wall member 5, the inclining surface portion 61 of the partition wall member 5 is deformed in such a way as to bulge toward the vehicle front side. Here, the inside handle 25 of the sliding door 19 is disposed close to the rear side of the vehicle outer end portion 63 of the partition wall member 5 in the vehicle width direction. However, by the deformation of the inclining surface portion 61 of the partition wall member 5, the vehicle outer end portion 63 of the partition wall member 5 moves in a direction away from the inside handle 25 of the sliding door 19. Thus, the partition wall member 5 does not come into contact with the inside handle 25, and the sliding door 19 is therefore prevented from being opened at the time of the side collision.

Note that, as shown in FIG. 7, in the cross section taken along line VII-VII in FIG. 5 (solid lines in FIG. 7), the inclining surface portion 61 is formed in such a way as to be closer to the vehicle rear side as extending toward the vehicle center CL. This portion is an upper end corner portion 71 on the front panel 35 shown in FIG. 4. This upper end corner portion 71 is significantly smaller in area than the whole inclining surface portion 61 and therefore influences the deformation of the whole inclining surface portion 61 only to a small extent. Thus, the inclining surface portion 61 is deformed toward the vehicle front side at the large area portion excluding the upper end corner portion 71, so that the vehicle outer end portion 63 of the partition wall member 5 moves in a direction away from the inside handle 25 of the sliding door 19.

(2) The partition wall member 5 includes the inclining surface portion 61 and the general surface portion 67 which bends at the edge 65 of the inclining surface portion 61 on the vehicle center side in the vehicle width direction and extends in the vehicle width direction. The boundary of these inclining surface portion 61 and general surface portion 67 forms the ridge line 69, and the reinforcement panel 51 extending to the ridge line 69 is lapped and attached to the inclining surface portion 61.

The reinforcement panel 51 improves the stiffness of the inclining surface portion 61, which makes the inclining surface portion 61 easily bendable at the ridge line 69. Thus, when a side collision load is inputted to the lateral side of the vehicle, the inclining surface portion 61 of the partition wall member 5 is easily bent toward the vehicle front side at the ridge line 69 and the partition wall member 5 is therefore more easily deformed in such a way as to bulge toward the vehicle front side. Hence, at the time of side collision of the vehicle, the vehicle outer end portion 63 of the partition wall member 5 in the vehicle width direction moves in a direction away from the inside handle 25 of the sliding door 19. Accordingly, it is possible to further prevent the sliding door 19 from being opened.

Specific embodiments of the present invention are described above, but the above embodiments are mere examples illustrated for the purpose of facilitating understanding of the present invention, and the present invention is not limited to the above embodiments. The technical scope of the present invention is not limited to the specific technical matters disclosed in the embodiments, but encompasses various modifications, changes, alternative techniques, and the like which can be easily derived therefrom.

With the vehicle interior structure according to one or more embodiments of the present invention, when a side collision load is inputted to the lateral side of the vehicle, the inclining surface portion of the partition wall member is deformed in such a way as to bulge toward the vehicle front side, so that the vehicle outer end portion of the partition wall member moves in a direction away from the inside handle of the door. Thus, the partition wall member does not come into contact with the inside handle. It is therefore possible to prevent the door from being opened at the time of the side collision.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

CL vehicle center
1 driver's seat
4 rear passenger's seat
5 partition wall member
19 sliding door (door)
25 inside handle
51 reinforcement panel
61 inclining surface portion
63 vehicle outer end portion
67 general surface portion
69 ridge line

The invention claimed is:

1. A vehicle interior structure comprising:
a driver's seat disposed inside a cabin;
a rear passenger's seat disposed on a vehicle rear side of the driver's seat inside the cabin;
a partition wail member extending in a vehicle width direction between the driver's seat and the rear passenger's seat; and
an inside handle that opens a door on a side of the rear passenger's seat,
wherein the inside handle is set at a position rearward of and close to a vehicle outer end portion of the partition wall member in the vehicle width direction, and
wherein the partition wall member includes an inclining surface portion inclining such that the inclining surface portion becomes closer to a vehicle front side as extending toward a vehicle center from the vehicle outer end portion.

2. A vehicle interior structure comprising:
a driver's seat disposed inside a cabin;
a rear passenger's seat disposed on a vehicle rear side of the driver's seat inside the cabin:
a partition wall member extending in a vehicle width direction between the driver's seat and the rear passenger's seat; and
an inside handle that opens a door on a side of the rear passengsr's seat,
wherein the inside handle is set at a position rearward of and close to a vehicle outer end portion of the partition wall member in the vehicle width direction, and
wherein the partition wall member includes an inclining surface portion inclining such that the inclining surface portion becomes closer to a vehicle front side as extending toward a vehicle center from the vehicle outer end portion,
wherein the partition wall member includes the inclining surface portion and a general surface portion which bends at an edge of the inclining surface portion on a vehicle center side in the vehicle width direction and extends in the vehicle width direction, wherein a boundary of the inclining surface portion and the general surface portion forms a ridge line, and wherein a reinforcement panel extending to the ridge line is lapped with and attached to the inclining surface portion.

\* \* \* \* \*

UNITED STATES PATENT AND TRADEMARK OFFICE
CERTIFICATE OF CORRECTION

PATENT NO. : 9,517,743 B2
APPLICATION NO. : 14/767614
DATED : December 13, 2016
INVENTOR(S) : Haruka Mochizuki et al.

Page 1 of 1

It is certified that error appears in the above-identified patent and that said Letters Patent is hereby corrected as shown below:

In the Claims

At Column 6, Claim number 1, Line number 35, "a partition wail" should read --a partition wall--.

Signed and Sealed this
Thirtieth Day of May, 2017

Michelle K. Lee
*Director of the United States Patent and Trademark Office*